(12) United States Patent
Nozaki

(10) Patent No.: US 10,060,364 B2
(45) Date of Patent: Aug. 28, 2018

(54) CONTROLLER FOR INTERNAL COMBUSTION ENGINE

(71) Applicant: TOYOTA JIDOSHA KABUSHIKI KAISHA, Toyota-shi (JP)

(72) Inventor: Tomohiro Nozaki, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 124 days.

(21) Appl. No.: 15/017,194

(22) Filed: Feb. 5, 2016

(65) Prior Publication Data

US 2016/0290254 A1    Oct. 6, 2016

(30) Foreign Application Priority Data

Mar. 31, 2015  (JP) .................................. 2015-073397

(51) Int. Cl.
*F02D 29/02* (2006.01)
*F02D 41/00* (2006.01)
(Continued)

(52) U.S. Cl.
CPC ........ *F02D 41/0002* (2013.01); *F02D 11/105* (2013.01); *F02D 13/0226* (2013.01);
(Continued)

(58) Field of Classification Search
CPC ............. F02D 41/0002; F02D 41/0055; F02D 41/123; F02D 41/005; F02D 41/0005;
(Continued)

(56) References Cited

U.S. PATENT DOCUMENTS 9,382,824 B2 * 7/2016 Yoshioka ........... F01M 13/0011
2006/0137660 A1 * 6/2006 Shirakawa .......... F02D 41/0005
123/493

(Continued)

FOREIGN PATENT DOCUMENTS

DE          101 29 343 A1    1/2002
DE     10 2010 014 822 A1    11/2010
(Continued)

OTHER PUBLICATIONS

Office Action dated Feb. 1, 2018 in German Patent Application No. DE76981.

*Primary Examiner* — Hai Huynh
*Assistant Examiner* — Gonzalo Laguarda
(74) *Attorney, Agent, or Firm* — Oblon, McClelland, Maier & Neustadt, L.L.P.

(57) ABSTRACT

There is provided a controller for an internal combustion engine that includes an exhaust gas recirculation device. The exhaust gas recirculation device includes an exhaust gas recirculation passage, which connects a portion of the intake passage located at a downstream side of the throttle valve with an exhaust passage, a recirculation valve, which opens and closes the exhaust gas recirculation passage, and an actuator, which drives and opens the recirculation valve. The controller includes a processor configured to execute a fuel cut-off process that stops fuel injection from the fuel injection valve, to open the recirculation valve when the fuel cut-off process is executed, and to execute a pressure increase process that increases pressure of the portion of the intake passage at the downstream side of the throttle valve before opening the recirculation valve.

6 Claims, 7 Drawing Sheets

(51) Int. Cl.
*F02D 41/12* (2006.01)
*F02D 11/10* (2006.01)
*F02M 26/49* (2016.01)
*F02D 13/02* (2006.01)
*F02M 26/20* (2016.01)
*F02M 26/21* (2016.01)

(52) U.S. Cl.
CPC ....... *F02D 41/0055* (2013.01); *F02D 41/123* (2013.01); *F02M 26/20* (2016.02); *F02M 26/21* (2016.02); *F02M 26/49* (2016.02); *F02D 2041/001* (2013.01); *F02D 2041/0017* (2013.01); *F02D 2200/0406* (2013.01); *Y02T 10/18* (2013.01); *Y02T 10/42* (2013.01); *Y02T 10/47* (2013.01)

(58) Field of Classification Search
CPC ....... F02D 2200/0406; F02D 2041/001; F02D 2041/0017; F02D 13/0226; F02D 11/105; Y02T 10/18; Y02T 10/42; Y02T 10/47; F02M 26/20; F02M 26/21; F02M 26/49
USPC ........................................................ 701/104
See application file for complete search history.

(56) References Cited

U.S. PATENT DOCUMENTS

| | | | |
|---|---|---|---|
| 2010/0235074 A1* | 9/2010 | Shinagawa | F02D 41/126 701/108 |
| 2010/0263627 A1* | 10/2010 | Whitney | F02D 11/10 123/399 |
| 2014/0020665 A1 | 1/2014 | Yoshioka | |
| 2014/0136086 A1* | 5/2014 | Sasaki | F02D 13/0215 701/112 |
| 2015/0007564 A1 | 6/2015 | Yoshioka | |
| 2015/0275773 A1* | 10/2015 | Huang | F02D 29/02 701/104 |
| 2016/0265485 A1* | 9/2016 | Massard | F02D 41/005 |

FOREIGN PATENT DOCUMENTS

| | | |
|---|---|---|
| JP | 2000-136760 | 5/2000 |
| JP | 2010-236516 | 10/2010 |
| JP | 2012-154313 | 8/2012 |
| JP | 2014-20247 | 2/2014 |
| JP | 2015-014275 A | 1/2015 |
| JP | 2015-36523 A | 2/2015 |

* cited by examiner

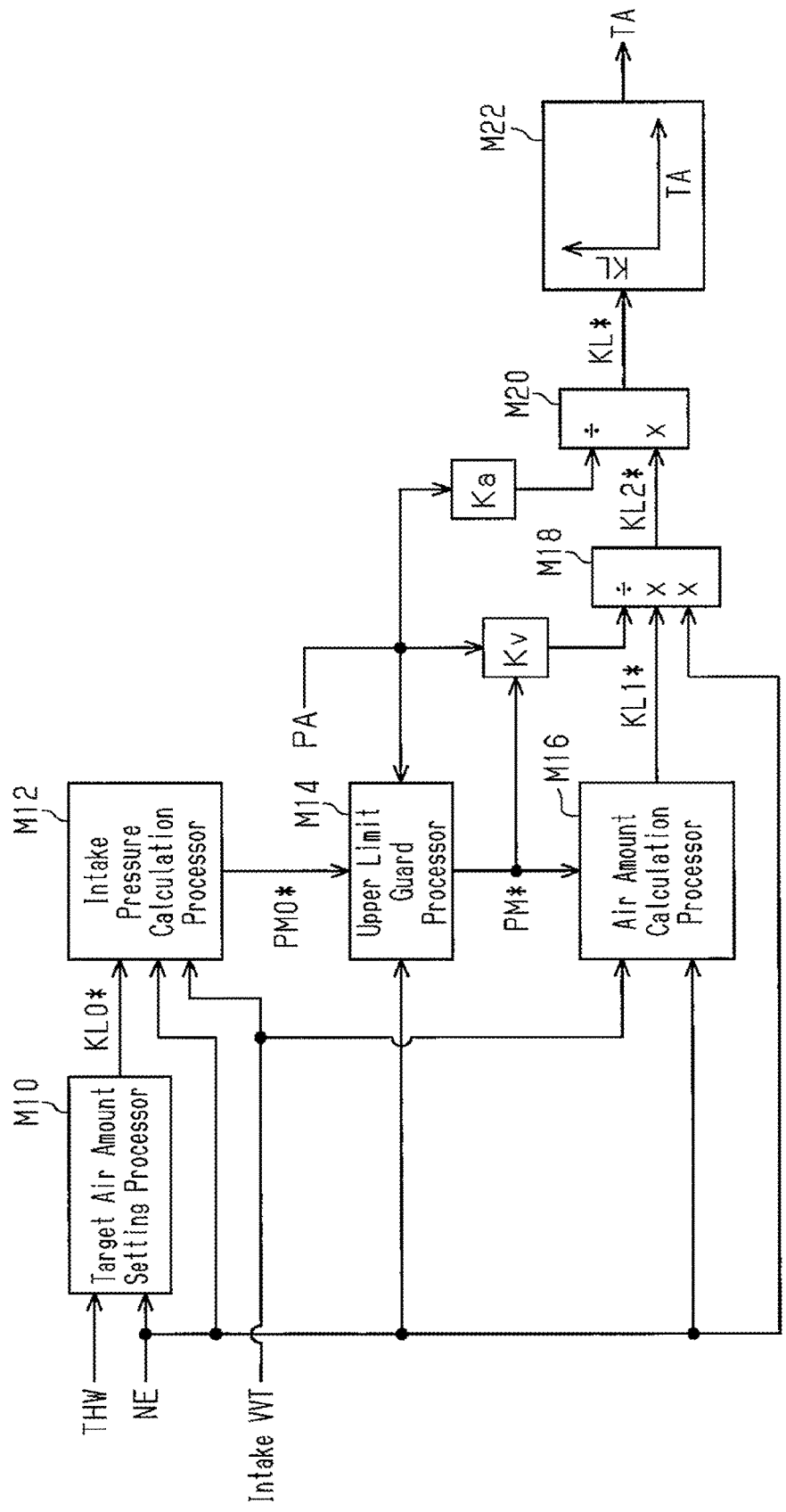

During Abnormality Diagnosis Process

When Abnormality Diagnosis is Not Requested

During Abnormality Diagnosis Process

When Abnormality Diagnosis Is Not Requested

CONTROLLER FOR INTERNAL COMBUSTION ENGINE

BACKGROUND ART

The present invention relates to a controller for an internal combustion engine including a throttle valve that adjusts a cross-sectional area of an intake passage, an exhaust gas recirculation device, and a fuel injection valve that injects fuel supplied to the internal combustion engine.

Japanese Laid-Open Patent Publication No. 2000-136760 discloses an example of an internal combustion engine that includes an exhaust gas recirculation device. The exhaust gas recirculation device includes an exhaust gas recirculation passage, which connects a portion of an intake passage with an exhaust passage, the portion being located at the downstream side of the throttle valve. The exhaust gas recirculation device also includes an EGR valve (recirculation valve), which opens and closes the exhaust gas recirculation passage, and an actuator, which opens the EGR valve. The EGR valve is configured to open when moved against the pressure of the exhaust passage. The actuator opens the recirculation valve by generating force that is in accordance with the difference of the pressure of the exhaust passage and the pressure of the intake passage.

There is a known method for diagnosing an exhaust gas recirculation device that includes a recirculation valve for an abnormality from the flow rate of fluid flowing into an intake passage via an exhaust gas recirculation passage when opening a recirculation valve while executing a fuel cut-off process that stops fuel injection in an internal combustion engine. The difference of the pressure of the exhaust passage and the pressure of the intake passage is especially large during the fuel cut-off process. When an actuator opens the recirculation valve during the fuel cut-off process, the actuator requires a large force. This may result in the enlargement of the actuator.

SUMMARY OF THE INVENTION

It is an object of the present invention to provide a controller for an internal combustion engine that reduces the size of an actuator that opens a recirculation valve during a fuel cut-off process.

In a controller for an internal combustion engine that solves the above problem, the internal combustion engine includes an exhaust gas recirculation device. The exhaust gas recirculation device includes an exhaust gas recirculation passage, which connects a portion of the intake passage located at a downstream side of the throttle valve with an exhaust passage, a recirculation valve, which opens and closes the exhaust gas recirculation passage, and an actuator, which drives and opens the recirculation valve. The controller includes a processor configured to execute a fuel cut-off process that stops fuel injection from the fuel injection valve, to open the recirculation valve when the fuel cut-off process is executed, and to execute a pressure increase process that increases pressure of the portion of the intake passage at the downstream side of the throttle valve before opening the recirculation valve.

BRIEF DESCRIPTION OF THE DRAWINGS

FIG. 4 is a block diagram showing the operation process of a throttle valve during a fuel cut-off, according to the first embodiment.

DETAILED DESCRIPTION OF THE PREFERRED EMBODIMENTS

First Embodiment

A first embodiment of a controller for an internal combustion engine will now be described with reference to the drawings.

Figure 1:
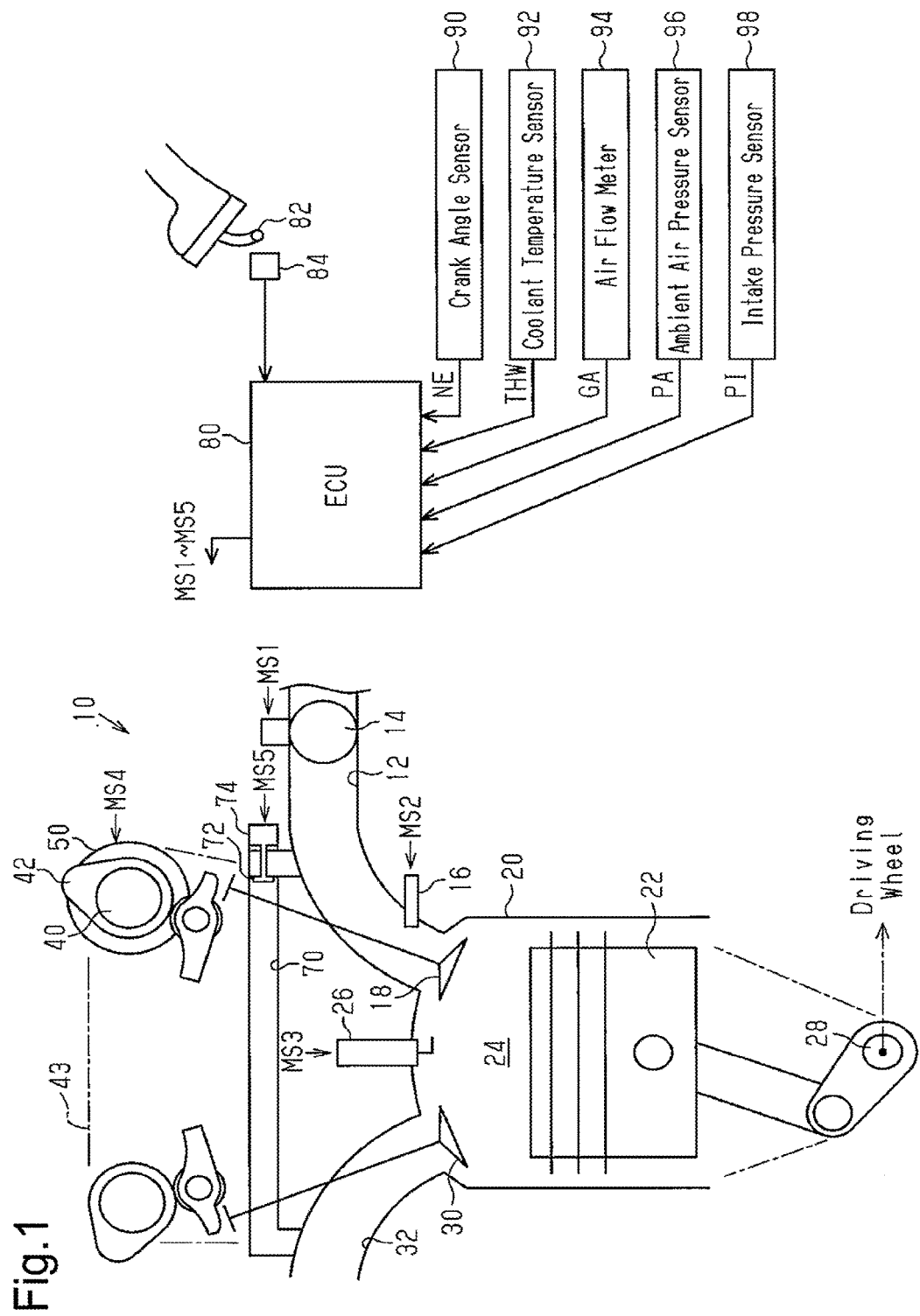
FIG. 1 is a diagram showing the structure of an internal combustion engine and an engine system that includes a controller of the internal combustion engine, according to a first embodiment.

As shown in FIG. 1, an internal combustion engine 10 includes an intake passage 12. A throttle valve 14, which adjusts the cross-sectional area of the intake passage 12, is arranged in the intake passage 12. A fuel injection valve 16 is located at the downstream side of the throttle valve 14. When an intake valve 18 opens, a mixture of fuel injected by the fuel injection valve 16 and air flowing through the throttle valve 14 is drawn into a combustion chamber 24, which is defined by a cylinder 20 and a piston 22. An ignition plug 26 is exposed to the combustion chamber 24. The air-fuel mixture drawn into the combustion chamber 24 is burned when ignited by a spark discharged from the ignition plug 26. The combustion generates energy that is converted into rotation energy of a crankshaft 28, which is an engine output shaft, by the reciprocation of the piston 22. Vehicle driving wheels are mechanically connectable to the crankshaft 28. Thus, the power of the crankshaft 28 is transmittable to the driving wheels.

Exhaust gas generated by the combustion of the air-fuel mixture in the combustion chamber 24 is discharged into an exhaust passage 32 when an exhaust valve 30 opens.

Rotation of a camshaft 40 opens and closes the intake valve 18. The camshaft 40 of the intake valve 18 includes a hydraulic variable valve timing mechanism 50, which adjusts the timings at which the intake valve 18 opens and closes, that is, adjusts a valve timing. Rotation force of the crankshaft 28 is transmitted to the variable valve timing mechanism 50 by a timing chain 43 and transmitted to the camshaft 40 by the variable valve timing mechanism 50. When the rotation force of the crankshaft 28 is transmitted to the camshaft 40, a cam 42, which is formed integrally with the camshaft 40, rotates and opens and closes the intake valve 18.

The variable valve timing mechanism 50 will now be described with reference to FIG. 2.

Figure 2:
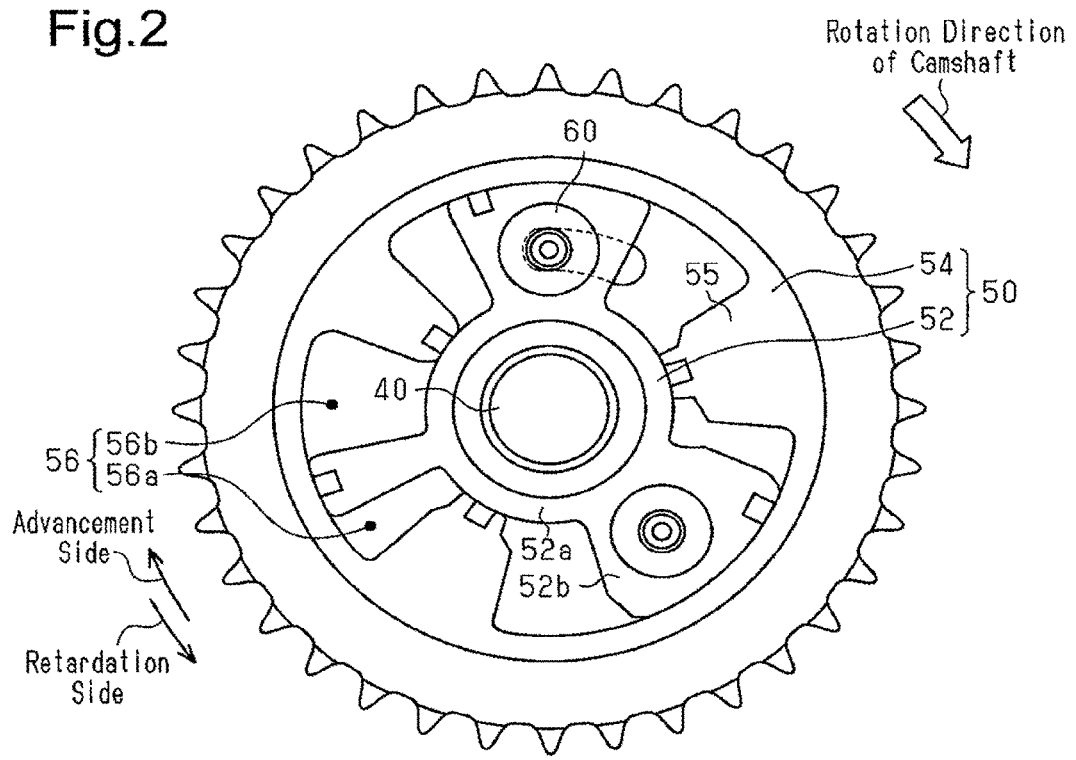
FIG. 2 is a plan view showing the structure of a variable valve timing mechanism, according to the first embodiment.

As shown in FIG. 2, the variable valve timing mechanism 50 includes a vane rotor 52, which rotates integrally with the camshaft 40 of the intake valve 18, and a tubular housing rotor 54, which rotates as the crankshaft 28 rotates. The vane rotor 52 includes a boss 52a, which is fixed to the camshaft 40 of the intake valve 18, and a plurality of (three in the first embodiment) vanes 52b, which project from the boss 52a toward the radially outer side. The vane rotor 52 is arranged in the housing rotor 54.

The housing rotor 54 includes a plurality of (three in the first embodiment) partition walls 55, which project toward the radially inner side. Accommodation chambers 56 are formed between the partition walls 55 that are adjacent to each other in the circumferential direction. Each of the accommodation chambers 56 is divided into two hydraulic chambers by the corresponding vane 52b of the vane rotor 52, which is arranged in the accommodation chamber 56. The hydraulic chamber that is located at the rear side of the vane 52b in the accommodation chamber 56 with respect to the rotation direction of the camshaft 40 is referred to as the advancement chamber 56a, which serves as an advancement hydraulic chamber. The hydraulic chamber that is located at the front side of the vane 52b in the accommodation chamber 56 with respect to the rotation direction of the camshaft 40 is referred to as the retardation chamber 56b, which serves as a retardation hydraulic chamber.

When hydraulic oil is supplied to the retardation chamber 56b and discharged from the advancement chamber 56a, the retardation chamber 56b has a higher hydraulic pressure than the advancement chamber 56a. This rotates the vane rotor 52 relative to the housing rotor 54 in a direction opposite to the rotation direction of the camshaft 40 (counterclockwise as viewed in FIG. 2). When the rotation phase of the vane rotor 52 relative to the housing rotor 54 is shifted in such a manner, the rotation phase of the camshaft 40 of the intake valve 18 relative to the crankshaft 28 is changed. This retards a valve timing of the intake valve 18. In the following description, "the rotation phase of the camshaft 40 of the intake valve 18 relative to the crankshaft 28" will be referred to as the "relative rotation phase."

When hydraulic oil is supplied to the advancement chamber 56a and discharged from the retardation chamber 56b, the advancement chamber 56a has a higher hydraulic pressure than the retardation chamber 56b. This rotates the vane rotor 52 relative to the housing rotor 54 in the rotation direction of the camshaft 40 (clockwise as viewed in FIG. 2). When the relative rotation phase is shifted in such a manner, the valve timing of the intake valve 18 is advanced.

As shown in FIG. 2, the variable valve timing mechanism 50 includes a middle locking mechanism 60. The middle locking mechanism 60 maintains the relative rotation phase at a middle phase, which is set between the most retarded phase and the most advanced phase. The most retarded phase is the relative rotation phase when the valve timing of the intake valve 18 is most retarded. The most advanced phase is the relative rotation phase when the valve timing of the intake valve 18 is most advanced. When the relative rotation phase is maintained at the middle phase, the valve timing of the intake valve 18 is maintained at a middle period, which is set between the most retarded period and the most advanced period. In the present embodiment, when idling the internal combustion engine 10, it is preferred that the relative rotation phase be maintained at the middle phase. Thus, the relative rotation phase is basically maintained at the middle phase when idling.

Referring back to FIG. 1, the internal combustion engine 10 includes an exhaust gas recirculation passage 70, which connects the intake passage 12 and the exhaust passage 32, a recirculation valve 72, which opens and closes the exhaust gas recirculation passage 70, and a valve actuator 74, which opens the recirculation valve 72.

Figure 3A:
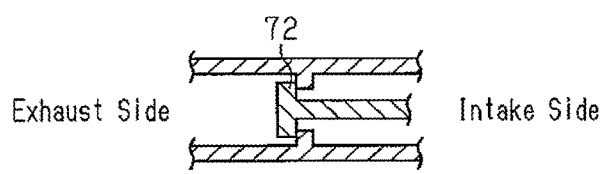
FIG. 3A is a cross-sectional view showing a recirculation valve when closed, according to the first embodiment.
Figure 3B:
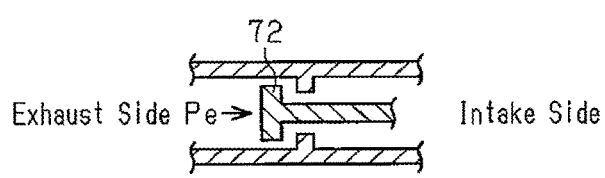
FIG. 3B is a cross-sectional view showing the recirculation valve when open, according to the first embodiment.

FIG. 3A shows the recirculation valve 72 when closed, and FIG. 3B shows the recirculation valve 72 when open. As shown in FIG. 3, the recirculation valve 72 receives pressure Pe, which is applied from an exhaust side of the exhaust gas recirculation passage 70. The recirculation valve 72 opens when moved against the pressure Pe from the side of the exhaust gas recirculation passage 70 corresponding to the intake passage 12 to the side of the exhaust gas recirculation passage 70 corresponding to the exhaust passage 32. The recirculation valve 72 is of a normally closed type in which the recirculation valve 72 opens when power is supplied to the valve actuator 74 of FIG. 1 and closes when the valve actuator 74 is deactivated. Preferably, an elastic member such as a spring applies force to the recirculation valve 72 in the direction in which the recirculation valve 72 closes.

A controller that controls the internal combustion engine 10, that is, an ECU 80 shown in FIG. 1, is a processor or control circuitry that includes a microcomputer having, for example, a CPU, a RAM, a ROM, and an input/output interface. The ECU 80 obtains a detection value of an acceleration depression amount sensor 84, which detects the depression amount of an accelerator pedal 82, the rotation speed NE of the internal combustion engine 10, which is detected by a crank angle sensor 90, and a coolant temperature THW, which is detected by a coolant temperature sensor 92. Further, the ECU 80 obtains an intake air amount GA, which is detected by an air flow meter 94, an ambient air pressure PA, which is detected by an ambient air pressure sensor 96, and an intake pressure PI of the intake passage 12 at the downstream side of the throttle valve 14, which is detected by an intake pressure sensor 98. Based on these detection values, the ECU 80 transmits operation signals MS1 to MS5 to various engine actuators including the throttle valve 14, the fuel injection valve 16, the ignition plug 26, the variable valve timing mechanism 50, and the valve actuator 74, to operate these engine actuators.

In particular, the ECU 80 functions as a throttle operation processor, which executes a process for changing the open degree TA of the throttle valve 14, during a fuel cut-off process that stops injecting fuel from the fuel injection valve 16.

FIG. 4 shows an operation process of the throttle valve 14 during a fuel cut-off process. This process is realized by the ECU 80.

A target air amount setting processor M10 sets a target air amount KL0*, which is a target value of the amount of air drawn into the combustion chamber 24, based on the coolant temperature THW and the rotation speed NE. The target air amount setting processor M10 sets the target air amount KL0* in accordance with, for example, a request for the application of the engine brake on the driving wheels through the crankshaft 28 and a request for the pressure of the combustion chamber 24 that are issued by the internal combustion engine 10. This can be realized by storing the relationship of the target air amount KL0* relative to the coolant temperature THW and the rotation speed NE, in advance. Excessive decrease in the pressure of the combustion chamber 24 increases the amount of oil flowing into the combustion chamber 24 through between a piston ring of the piston 22 and the wall of the cylinder 20. The "request for the pressure of the combustion chamber 24" is issued to avoid such a situation.

An intake pressure calculation processor M12 calculates a target intake pressure PM0* based on the target air amount KL0*, the rotation speed NE, and an opening timing of the intake valve 18 (intake VVT). This can be realized by storing, in advance, in a memory a map that defines the relationship of the intake pressure relative to the amount of air drawn into the combustion chamber 24, the rotation speed NE, and the intake VVT. The map can be generated in advance, for example, by measuring the intake pressure obtained when making various settings for the amount of air drawn into the combustion chamber 24, the rotation speed NE, and an intake VVT.

An upper limit guard processor M14 calculates a target intake pressure PM* by executing an upper limit guard process for the target intake pressure PM0* based on the rotation speed NE and the ambient air pressure PA. In this process, the target intake pressure PM is set to an upper limit value when the target intake pressure PM0* is larger than the upper limit value. The upper limit value is set to less than or equal to the ambient air pressure PA. This is because it is assumed that the present embodiment does not include a supercharger and thus the intake pressure never exceeds the ambient air pressure PA. The upper limit value is set in accordance with the rotation speed NE because the maximum intake pressure depends on the rotation speed NE. The setting process of the upper limit value can be realized by storing a map and a relational expression in advance. The map and the relational expression are generated based on the maximum value of the intake pressure that is measured when setting various operation amounts of the engine actuators for various rotation speeds NE.

An air amount calculation processor M16 calculates a target air amount KL1* based on the target intake pressure PM*, the rotation speed NE, and the intake VVT. This can be realized by storing, in advance, in the memory a map that defines the relationship of the amount of air drawn into the combustion chamber 24 relative to the intake pressure, the rotation speed, and the intake VVT. This map can be generated in advance, for example, by measuring the amount of air drawn into the combustion chamber 24 when making various settings for the intake pressure, the rotation speed, and an intake VVT.

An air flow rate calculation processor M18 calculates a target air flow rate KL2*, which is a target value of the flow rate of air that flows through the throttle valve 14, by multiplying the target air amount KL1* by the rotation speed NE and by dividing the value obtained through the multiplication by a velocity coefficient Kv. The rotation speed NE is multiplied because as the rotation speed NE increases, the number of intake strokes of the piston 22 per unit time increases. The flow rate of air that flows through the throttle valve 14 depends on the changing differential pressure between the front and rear of the throttle valve 14. The velocity coefficient Kv is an operation parameter for maintaining the amount of air drawn into the combustion chamber 24 at the target air amount KL0* regardless of the change in flow rate of air that results from the differential pressure. Further, the velocity coefficient Kv is an operation parameter that is set based on the target intake pressure PM* and the ambient air pressure PA.

An atmospheric pressure correction processor M20 calculates a target air flow rate KL*, which is a final target value of the flow rate of air that flows through the throttle valve 14, by correcting the target air flow rate KL2* based on an atmospheric correction coefficient Ka. The atmospheric correction coefficient Ka is a parameter that is variably set in accordance with the ambient air pressure PA.

An open degree setting processor M22 calculates the open degree TA of the throttle valve 14 based on the target air flow rate KL*. The open degree setting processor M22 includes a map that defines the relationship between the flow rate of air that flows through the throttle valve 14 and the open degree TA of the throttle valve 14 when the differential pressure of the throttle valve 14 is a referential differential pressure. Thus, when the differential pressure of the throttle valve 14 deviates from a reference value, the target air flow rate KL* that is input in the open degree setting processor M22 differs from the flow rate of air that actually flows through the throttle valve 14. The target air flow rate KL* is an operation parameter for setting the open degree TA of the throttle valve 14 to an appropriate value.

The calculated open degree TA is the amount of an open loop operation for controlling the amount of air drawn into the combustion chamber 24 to conform to the target air amount KL0*. The ECU 80 transmits an operation signal to the throttle valve 14 to operate the open degree of the throttle valve 14 to conform to the calculated open degree TA.

During the fuel cut-off process, the ECU 80 basically sets the intake VVT to a value for idling and closes the recirculation valve 72. When an abnormality diagnosis request is generated during the fuel cut-off process, the ECU 80 opens the recirculation valve 72 to execute the abnormality diagnosis process on an exhaust gas recirculation device that includes the exhaust gas recirculation passage 70, the recirculation valve 72, and the valve actuator 74. When the ECU 80 opens the recirculation valve 72, the ECU 80 diagnoses the exhaust gas recirculation device to determine whether or not an abnormality exists based on whether or not fluid flows from the exhaust gas recirculation passage 70 to the intake passage 12.

Figure 5:
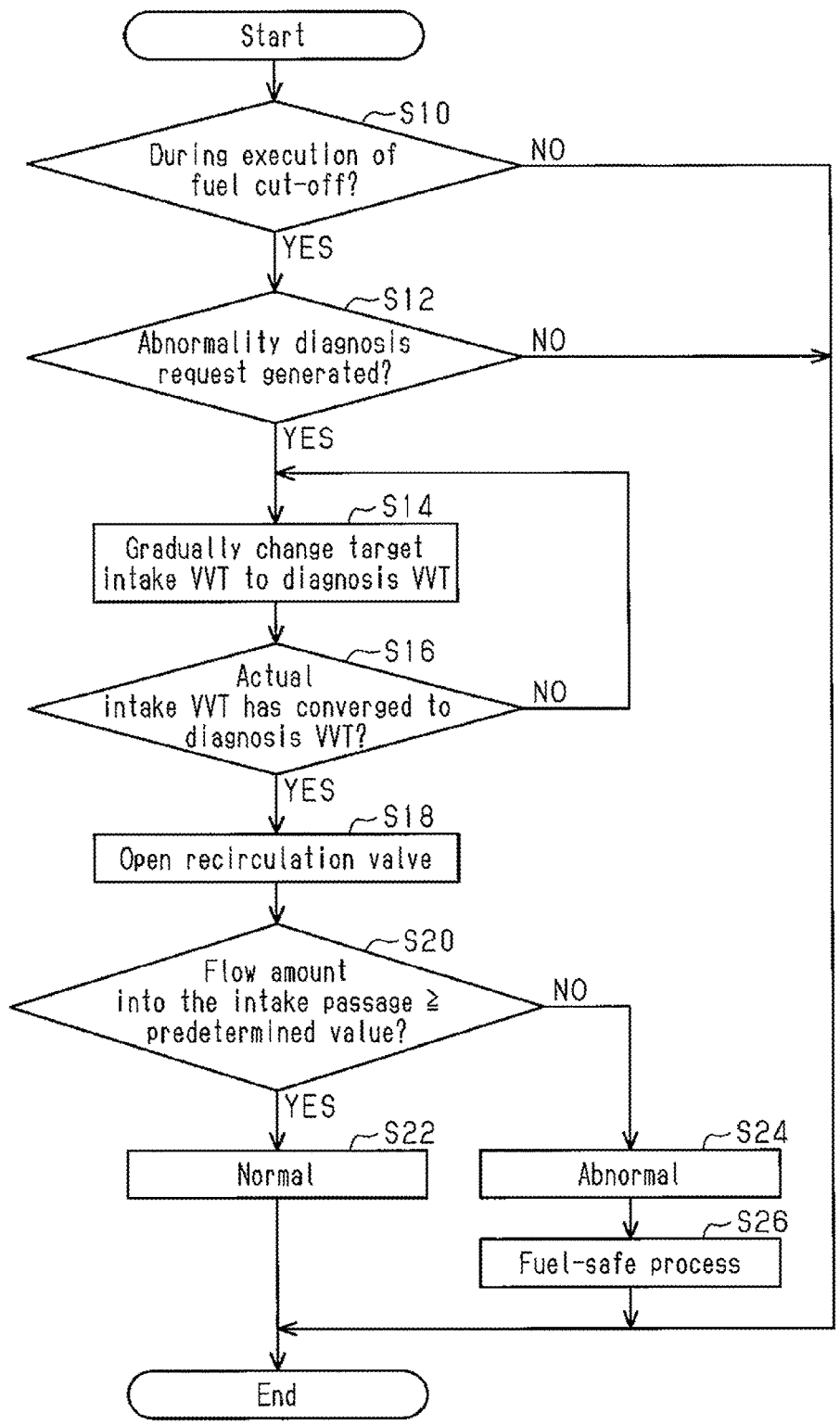
FIG. 5 is a flowchart showing an abnormality diagnosis process of an EGR device, according to the first embodiment.

FIG. 5 shows the procedures of the abnormality diagnosis process. This process is repeatedly executed by the ECU 80, which functions as an abnormality diagnosis processor, when predetermined conditions are satisfied, for example.

In a series of processes shown in FIG. 5, the ECU 80 first determines whether or not the fuel cut-off process is being executed (S10). The fuel cut-off process is executed under the conditions that the rotation speed NE of the crankshaft 28 is greater than or equal to a predetermined speed and that the accelerator pedal 82 is released.

When the ECU 80 determines that the fuel cut-off process is being executed (S10: YES), the ECU 80 determines whether or not an abnormality diagnosis request has been issued for the exhaust gas recirculation device (S12). The abnormality diagnosis request is generated when the following conditions are all satisfied:

(A) the abnormality diagnosis process has not been executed in the current trip, that is, from when an ignition switch has been turned on;

(B) a predetermined time has elapsed from when the fuel cut-off process started;

(C) the amount of changes in the rotation speed NE of the crankshaft 28 is less than or equal to a predetermined value; and (D) the amount of changes in a load of the internal combustion engine 10 is less than or equal to a predetermined value (load refers to, for example, amount of intake air).

The above conditions (B) to (D) indicate that the internal combustion engine 10 is stable. The conditions for generating an abnormality diagnosis request, that is, conditions for executing an abnormality diagnosis allows for highly accurate detection of whether or not fluid flows from the exhaust gas recirculation passage 70 into the intake passage 12 when the recirculation valve 72 opens.

When the ECU 80 determines that the abnormality diagnosis request is generated (S12: YES), the ECU 80 executes a gradual changing process in which a target value of the intake VVT (target intake VVT) is gradually changed to a diagnosis VVT (S14). under the condition that a pressure in the intake passage 12 at the downstream side of the throttle valve 14 is a given value, the amount of air drawn into the combustion chamber 24 is lower when the intake VVT is set to the diagnosis VVT than when the intake VVT is set to a normal timing during the fuel cut-off process. More specifically, during the fuel cut-off process, since the present embodiment basically controls the intake VVT to a timing of idling, the intake VVT is basically fixed by the middle locking mechanism 60 as described above. Accordingly, the diagnosis VVT is set in advance to a timing in which the amount of air drawn into the combustion chamber 24 is lower than the amount of air drawn into the combustion chamber 24 when the intake VVT is fixed by the middle locking mechanism 60, under the condition that a pressure in the intake passage 12 at the downstream side of the throttle valve 14 is a given value.

The amount of air drawn into the combustion chamber 24 changes in accordance with the intake VVT and the pressure of the intake passage 12. In particular, the amount of air drawn into the combustion chamber 24 increases as the pressure of the intake passage 12 increases. Thus, the diagnosis VVT is set as described above. That is, in the present embodiment, the amount of air drawn into the combustion chamber 24 is controlled to conform to the target air amount KL0*. Accordingly, the intake VVT is set as the diagnosis VVT, and the throttle valve 14 is operated so that the pressure of the intake passage 12 becomes higher than when the intake VVT is set to a normal timing during the fuel cut-off process.

The ECU 80 executes the gradual changing process until the actual intake VVT converges to the diagnosis VVT (S16: NO). When the ECU 80 determines that the actual intake VVT has converged to the diagnosis VVT (S16: YES), the ECU 80 outputs an operation signal to the valve actuator 74 to open the recirculation valve (S18). It is desirable that the ECU 80 determine that the actual intake VVT has converged to the diagnosis VVT when the actual intake VVT has become the diagnosis VVT and the transitional period during which the amount of air drawn into the combustion chamber 24 of the internal combustion engine 10 is changed ends and the intake air amount becomes a normal value. The determination that the intake air amount has become a normal value is made based on, for example, whether or not a predetermined time has elapsed from when the actual intake VVT becomes the diagnosis VVT.

When the ECU 80 opens the recirculation valve, the ECU 80 determines whether or not the amount of fluid that flows from the exhaust gas recirculation passage 70 into the intake passage 12 is larger than or equal to a predetermined value (S20). More specifically, the ECU 80 determines whether or not the increased amount of the intake pressure PI, which is detected by the intake pressure sensor 98, is larger than or equal to a predetermined increased amount. This is because the increased amount of the intake pressure PI is larger than or equal to the predetermined increased amount when the amount of fluid that flows from the exhaust gas recirculation passage 70 into the intake passage 12 is larger than or equal to a predetermined value.

When the ECU 80 determines that the amount of fluid that flows into the intake passage 12 is larger than or equal to the predetermined value (S20: YES), the ECU 80 diagnoses the exhaust gas recirculation device as being normal (S22). In contrast, when the ECU 80 determines that the amount of fluid that flows into the intake passage 12 is less than the predetermined value (S24: NO), the ECU 80 diagnoses the exhaust gas recirculation device as being abnormal (S24).

Subsequently, the ECU 80 executes a fail-safe process (S26). More specifically, the ECU 80 notifies the user that an abnormality has occurred by, for example, activating a warning lamp. Instead, the ECU 80 may execute, for example, a process for avoiding operation of the internal combustion engine 10 at an operation point where it is difficult to maintain a predetermined exhaust characteristic since the recirculation valve 72 does not open. The operating point is determined by the rotation speed NE and the load of the internal combustion engine 10.

The ECU 80 ends the series of processes when completing the process of step S22 or S26 or when giving a negative determination for the process of step S10 or S12.

The operation of the present embodiment will now be described.

Figure 6A:
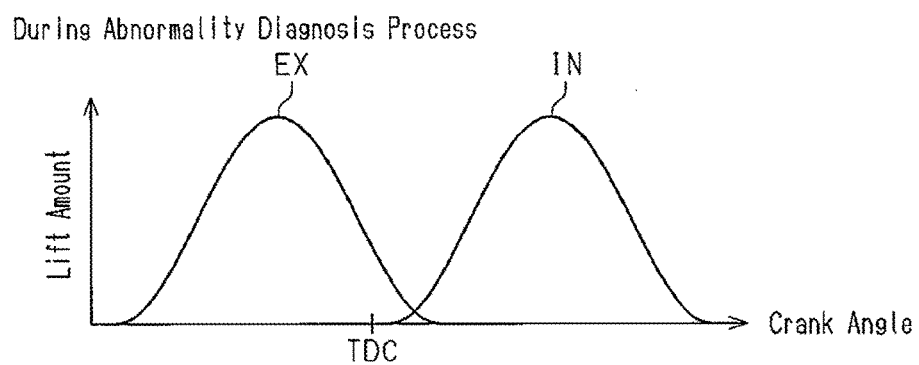
FIGS. 6A and 6B are time charts showing a valve timing during a fuel cut-off.
Figure 6B:
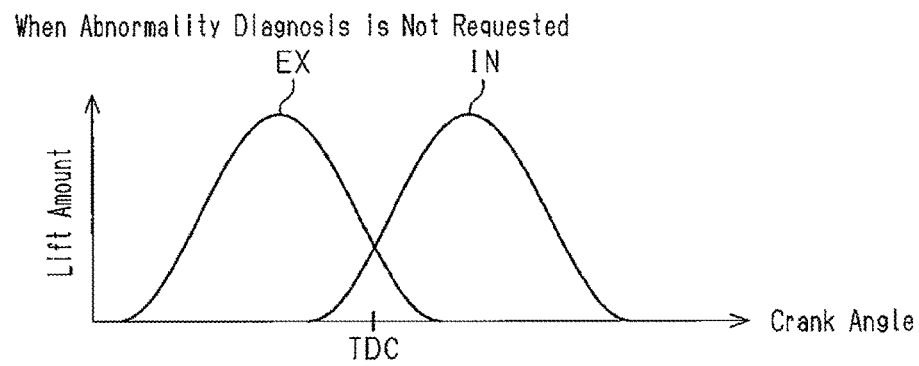

The ECU 80 gradually changes the intake VVT to the diagnosis VVT when an abnormality diagnosis request is issued during a fuel cut-off process. FIG. 6A shows the transition in the lift amount of the intake valve 18 (IN in FIG. 6A) when the abnormality diagnosis process is executed and the transition in the lift amount of the exhaust valve 30 (EX in FIG. 6A) when the abnormality diagnosis process is executed. FIG. 6B shows the transitions in the lift amount of the intake valve 18 and the exhaust valve 30 when the fuel cut-off process is being executed and when the abnormality diagnosis request is not generated.

In the examples shown in FIGS. 6A and 6B, after the abnormality diagnosis request is generated, the ECU 80 sets the intake VVT to the retardation side as compared to when the fuel cut-off process is being executed but the abnormality diagnosis process is not executed. That is, in the present embodiment, it is assumed that when the intake VVT is set to the retardation side as compared to during idling, the amount of air drawn into the combustion chamber 24 is decreased under the condition that a pressure in the intake passage 12 at the downstream side of the throttle valve 14 is a given value.

When the actual intake VVT becomes the diagnosis VVT, the ECU 80 sets the intake VVT to the diagnosis VVT, the intake VVT serving as an input parameter of the intake pressure calculation processor M12 and the air amount calculation processor M16 shown in FIG. 4. The target air flow rate KL* input in the open degree setting processor M22 is larger than when the intake VVT is set at a timing for idling. Thus, the open degree setting processor M22 increases the open degree TA of the throttle valve 14. Accordingly, the pressure of the intake passage 12 located at the downstream side of the throttle valve 14 is increased. This decreases the difference of the pressure of the exhaust passage 32 and the pressure of the intake passage 12 located at the downstream side of the throttle valve 14.

The present embodiment has the advantages described below.

(1) The ECU 80 opens the recirculation valve 72 when executing the fuel cut-off process. When the fuel cut-off process is executed, the pressure of the intake passage 12 located at the downstream side of the throttle valve 14 particularly tends to decrease. The ECU 80 increases the pressure of the intake passage 12 located at the downstream side of the throttle valve 14 before opening the recirculation valve 72 to execute the abnormality diagnosis process of the exhaust gas recirculation device. Thus, the pressure that the recirculation valve 72 receives from the side corresponding to the intake passage 12 when opening the recirculation valve 72 is increased as compared to when the ECU 80 does not increase the pressure. This reduces the difference between the pressure applied from the exhaust passage 32 to the recirculation valve 72 and the pressure applied from the intake passage 12. Accordingly, the device configured to generate a request for opening the recirculation valve 72 during the fuel cut-off process is capable of reducing the force required when opening the recirculation valve 72. Thus, the valve actuator 74 that opens the recirculation valve 72 does not have to be enlarged.

(2) The ECU 80 increases the open degree of the throttle valve 14 before opening the recirculation valve 72. This reduces the throttling effect produced by the throttle valve 14 and increases the pressure of the intake passage 12 at the downstream side of the throttle valve 14.

(3) Before opening the recirculation valve 72, the ECU 80 increases the open degree of the throttle valve 14 and operates the variable valve timing mechanism 50 (variable valve characteristic mechanism) to reduce the amount of air drawn into the combustion chamber 24. This limits excessive increases in the amount of air drawn into the combustion chamber 24. Further, this limits changes in the torque (load torque) generated in the crankshaft 28 that results from an increase in the open degree of the throttle valve 14.

(4) During the fuel cut-off process, the ECU 80 sets a target value of the amount of air drawn into the combustion chamber 24 and operates the open degree TA of the throttle valve 14 so that the actual air amount conforms to the target value. Further, the ECU 80 changes the intake VVT to the diagnosis VVT. This increases the pressure of the intake passage 12 at the downstream side of the throttle valve. In addition, since the amount of air drawn into the combustion chamber 24 can be set to the target value, brake force (engine brake), which is the negative torque applied to the driving wheels by the internal combustion engine 10, can be maintained at an appropriate value.

(5) The ECU 80 operates the throttle valve 14 based on the target value of the amount of air drawn into the combustion chamber 24 and the characteristics of the intake valve 18, that is, the intake VVT. By using the characteristics of the intake valve 18, the amount of air drawn into the combustion chamber 24 can be determined under the condition that a pressure in the intake passage 12 is a given value. Thus, the open degree of the throttle valve 14 can be set so that the amount of air drawn into the combustion chamber 24 is a target value without using a value detected by dedicated hardware that detects the pressure of the intake passage 12. More specifically, the ECU 80 uses the target intake pressure PM* defined from the air model of FIG. 4 as an intake pressure that is used to set the open degree TA of the throttle valve 14. This allows the open degree TA of the throttle valve 14 to be set based on the intake pressure that is appropriate for the target value of the amount of air drawn into the combustion chamber 24 instead of being set based on the state of the current intake passage 12.

(6) The ECU 80 gradually changes the intake VVT to the diagnosis VVT. This reduces the change in the brake force (engine brake), which is the negative torque applied to the driving wheels by the internal combustion engine 10, and consequently limits decreases in the drivability.

Second Embodiment

A controller for an internal combustion engine of a second embodiment will now be described, focusing on differences from the first embodiment, with reference to the drawings.

The second embodiment differs from the first embodiment in that the second embodiment includes a variable valve actuation angle mechanism 100 as a variable valve characteristic mechanism, instead of the variable valve timing mechanism 50.

Figure 7:
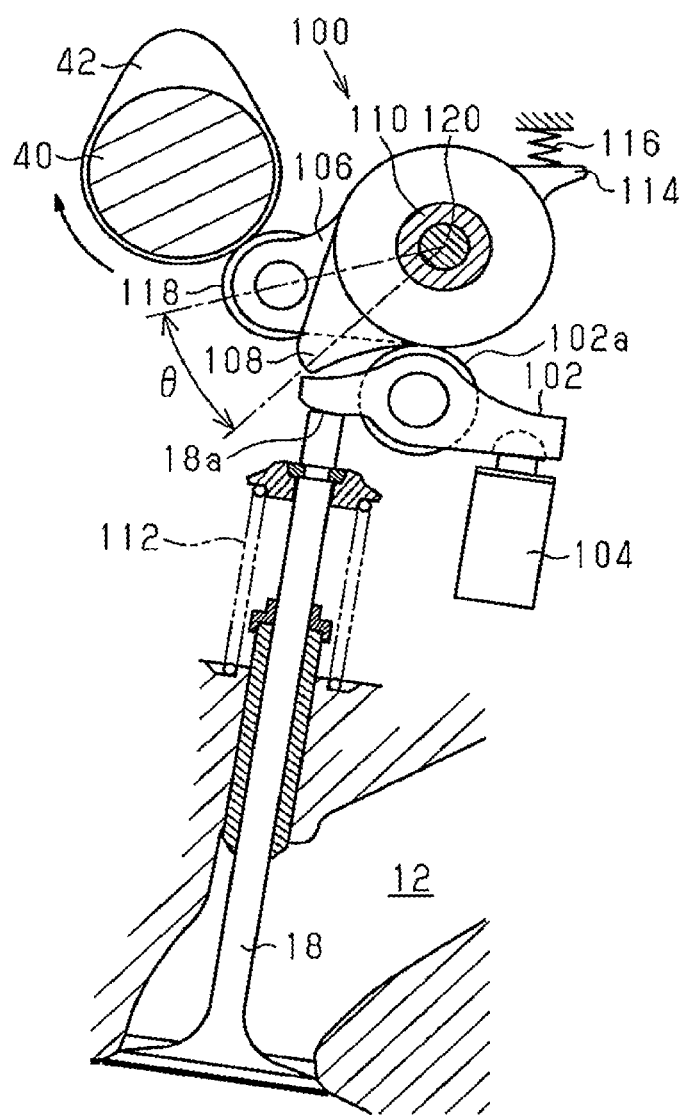
FIG. 7 is a side view showing the structure of a variable valve actuation angle mechanism, according to a second embodiment.

FIG. 7 shows the structure of the variable valve actuation angle mechanism 100.

As shown in FIG. 7, a lash adjuster 104 is arranged near the intake valve 18, and a rocker arm 102 is arranged between the lash adjuster 104 and the intake valve 18. One end of the rocker arm 102 is supported by the lash adjuster 104, and the other end of the rocker arm 102 abuts against an end 18a of the intake valve 18.

The variable valve actuation angle mechanism 100 is arranged between the rocker arm 102 and the cam 42. The variable valve actuation angle mechanism 100 includes an input arm 106 and an output arm 108. The input arm 106 and the output arm 108 are supported pivotally about a supporting pipe 110, which is fixed to a cylinder head. The rocker arm 102 is biased toward the output arm 108 by a biasing force applied from a valve spring 112. A roller 102a, which is arranged in the middle portion of the rocker arm 102, abuts against the outer surface of the output arm 108.

A projection 114 projects from the outer circumferential surface of the variable valve actuation angle mechanism 100. The projection 114 receives a biasing force from a spring 116, which is arranged in the cylinder head. Due to the biasing force applied from the spring 116, a roller 118, which is arranged at a distal end of the input arm 106, abuts against the outer surface of the cam 42. Thus, when the camshaft 40 rotates while the engine is operating, the variable valve actuation angle mechanism 100 pivots about the supporting pipe 110. When the output arm 108 pushes the rocker arm 102, the rocker arm 102 pivots around a portion supported by the lash adjuster 104. This opens and closes the intake valve 18.

A control shaft 120 is inserted into the supporting pipe 110. The control shaft 120 is movable relative to the supporting pipe 110 in the axial direction. Axial movement of the control shaft 120 changes a relative phase difference of the input arm 106 and the output arm 108 around the supporting pipe 110, that is, an angle θ shown in FIG. 7. When the angle θ decreases, the maximum lift amount and the opening period (actuation angle) of the intake valve 18 decrease.

The structure for changing the angle 9 with the axial movement of the control shaft 120 may be as follows. The input arm 106 and the output arm 108 are hollow members. The inner surface of the input arm 106 and the inner surface of the output arm 108 include helical splines, which have tooth traces extending in opposite directions. The outer surface of the supporting pipe 110 includes a slider gear, which is rotatable in the axial direction integrally with the control shaft 120 and is rotatable relative to the control shaft 120. The slider gear is engaged with the helical splines formed in the inner surfaces of the input arm 106 and the output arm 108. Thus, when the control shaft 120 is moved in the axial direction, the slider gear is moved in the axial direction to rotate the input arm 106 and the output arm 108 in the opposite direction. This allows the angle θ to be changed.

During idling, when the control shaft 120 is located at a predetermined position, the ECU 80 fixes the valve actuation angle of the intake valve 18 to that for idling. During a fuel cut-off process, the ECU 80 basically controls the valve actuation angle to that for idling. When the abnormality diagnosis request is generated, the position of the control shaft 120 is changed to reduce the amount of air drawn into the combustion chamber 24 under the condition that a pressure in the intake passage 12 at the downstream side of the throttle valve 14 is a given value.

Figure 8A:
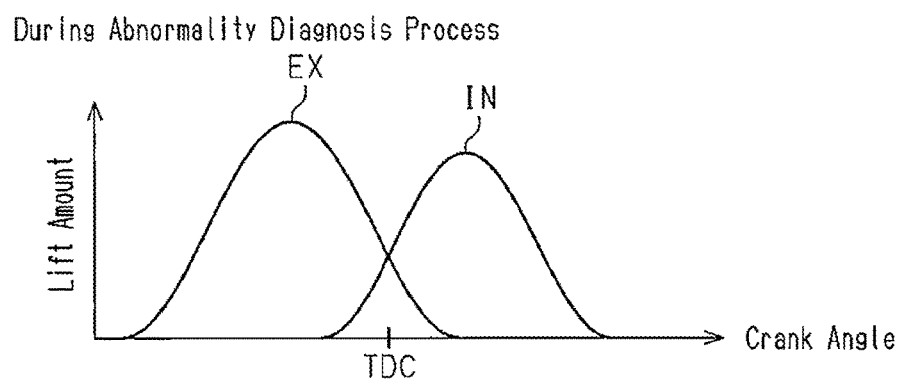
FIGS. 8A and 8B are time charts showing the actuation angle during a fuel cut-off.
Figure 8B:
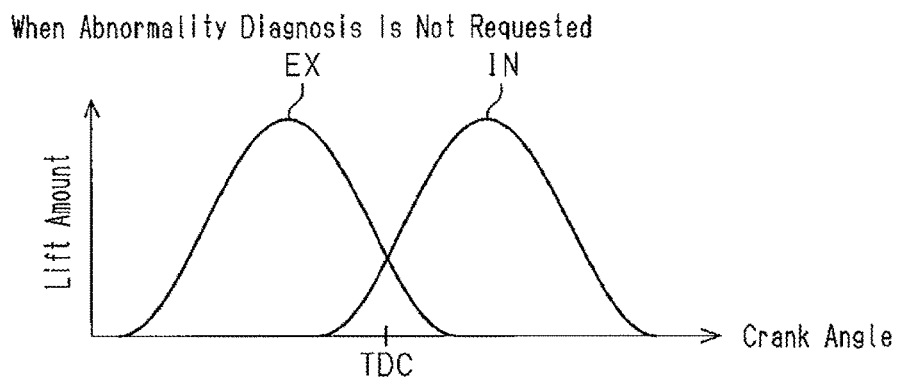

FIG. 8A shows the valve actuation angle when the abnormality diagnosis process of the second embodiment is executed. FIG. 8B shows the valve actuation angle during a fuel cut-off process when the abnormality diagnosis process is not executed. It is assumed that when the valve actuation angle is set to be smaller than that for idling, the amount of air drawn into the combustion chamber 24 is reduced under the condition that a pressure in the intake passage 12 at the downstream side of the throttle valve 14 is a given value. Thus, as shown in FIG. 8, the ECU 80 reduces the valve actuation angle when executing the abnormality diagnosis process.

In the second embodiment, the intake pressure calculation processor M12 of FIG. 4 calculates the target intake pressure PM0* based on the target air amount KL0*, the rotation speed NE, and the valve actuation angle. This can be realized by storing, for example, a map that defines the relationship of the target intake pressure PM0* relative to the target air amount KL0*, the rotation speed NE, and the valve actuation angle in advance in the memory. The air amount calculation processor M16 calculates the target air amount KL1* based on the target intake pressure PM*, the rotation speed NE, and the valve actuation angle. This can be realized by storing, for example, a map that defines the relationship of the target air amount KL1* relative to the target intake pressure PM*, the rotation speed NE, and the valve actuation angle in advance in the memory.

Other Embodiments

At least one of the items in the above embodiments may be changed as follows. The following description includes portions in which the reference numbers illustrate the relationships between the matters described in "THE SUMMARY OF THE INVENTION" and the matters of the above embodiments. However, the above matters are not intended to be restricted to the illustrated relationships.

Variable Valve Timing Mechanism

The variable valve timing mechanism does not have to include the middle locking mechanism 60. Even when the variable valve timing mechanism does not include the middle locking mechanism 60, as long as the ECU 80 can set a valve timing for idling and there is a valve timing in which the amount of air drawn into the combustion chamber 24 is smaller than when the valve timing for idling is set under the condition that an intake pressure is a given value, the advantage of FIG. 6A can be obtained.

The variable valve timing mechanism does not have to be of a hydraulic type in which the power that changes the rotation phase of the camshaft 40 relative to the rotation phase of the crankshaft 28 is obtained by hydraulic pressure. The variable valve timing mechanism may obtain the power from, for example, a motor. This can be realized by respectively connecting, for example, a sun gear, a ring gear, and a carrier of a planetary gear mechanism to a motor, a camshaft, and a sprocket that receives power from a crankshaft.

Variable Valve Actuation Angle Mechanism

The variable valve actuation angle mechanism is not limited to that shown in FIG. 7. The variable valve actuation angle mechanism may include, for example, a cam that has a form in which the distance from the camshaft 40 to a cam nose gradually increases from one axial end of the camshaft 40 toward the other axial end. The variable valve actuation angle mechanism may also include a device that moves the camshaft in the axial direction.

Variable Valve Characteristic Mechanism (50, 100)

The internal combustion engine 10 does not have to include only one of the variable valve timing mechanism 50 and the variable valve actuation angle mechanism 100 as a variable valve characteristic mechanism. Instead, the internal combustion engine 10 may include both the variable valve timing mechanism 50 and the variable valve actuation angle mechanism 100. Further, the variable valve characteristic mechanism may be configured to change, for example, the lift amount while fixing the actuation angle.

This can be realized by using, for example, an electromagnetic drive valve to open and close an engine valve instead of using the rotation power of the camshaft 40.

Valve Operation Processor (S14)

When the internal combustion engine 10 includes both the variable valve timing mechanism 50 and the variable valve actuation angle mechanism 100, the internal combustion engine 10 may execute at least one of first and second processes. The first process controls the valve timing so that the amount of air drawn into the combustion chamber 24 is smaller than when the valve timing is set to that for idling under the condition that an intake pressure is a given value. The second process controls the valve actuation angle so that the amount of air drawn into the combustion chamber 24 is smaller than when the valve angle is set for idling under the condition that the intake pressure is a given value. For example, when only the second process is executed, the valve timing for idling may be such that the amount of air drawn into the combustion chamber 24 is the smallest under the condition that the intake pressure is a given value. When only the first process is executed, the valve actuation angle for idling may be such that the amount of air drawn into the combustion chamber 24 is the smallest under the condition that the intake pressure is a given value.

This is applicable to an internal combustion engine that executes control so that the valve timing and the actuation angle during the fuel cut-off process differ from those for idling. In this case, the valve timing and the actuation angle during the abnormality diagnosis are set so that the amount of air drawn into the combustion chamber 24 is smaller than when the fuel cut-off process is being executed and the abnormality diagnosis is not executed under the condition that the intake pressure is a given value.

The valve operation processor does not have to include the target air amount setting processor. Even in this case, if the abnormality diagnosis process is executed, the intake VVT can be set so that the amount of air drawn into the combustion chamber 24 is smaller than when the abnormality diagnosis process is not executed under the condition that the intake pressure is a given value. Further, the control for increasing the open degree of the throttle valve 14 can be executed. This increases the intake pressure while reducing changes in the force of the engine brake as compared to when the abnormality diagnosis process is not executed.

Target Air Amount Setting Processor (M10)

The target air amount does not have to be set based on the coolant temperature THW and the rotation speed NE. For example, the target air amount may be set only in accordance with the rotation speed NE.

Air Amount Adjustment Processor (M12 to M22)

For example, the air amount adjustment processor does not have to include the upper limit guard processor M14. Even in this case, when the velocity coefficient Kv is calculated using the intake pressure calculated by the intake pressure calculation processor M12, the intake pressure calculation processor M12 calculates the intake pressure based on the intake VVT. Thus, the open degree TA of the throttle valve 14 can be calculated in accordance with the intake VVT (characteristics of intake valve).

The air amount adjustment processor does not have to include the intake pressure calculation processor M12. Even in this case, the intake pressure PI is input to execute a feedback control for the air amount calculated by the air amount calculation processor M16 to the target air amount KL0*. Thus, the open degree TA of the throttle valve 14 can be calculated in accordance with the intake VVT (characteristics of intake valve).

For example, the target air flow rate KL* may be operated (corrected) to execute the feedback control for an output value of the air flow meter 94, which is assumed from the target air amount KL0*, to an actual output value of the air flow meter 94.

Further, the air amount adjustment processor does not have to use a model. For example, the intake air amount GA detected by the air flow meter 94 may be used to calculate the open degree TA of the throttle valve 14 to execute the feedback control for a target value defined from the target air amount KL0*. Thus, when the amount of air drawn into the combustion chamber 24 is detected by a sensor, the intake VVT (characteristics of intake valve) does not have to be used to calculate the open degree TA of the throttle valve 14.

Pressure Increase Processor (S14, M10 to M22)

The pressure increase processor does not have to execute the process for reducing the amount of air drawn into the combustion chamber 24 under the condition that the intake pressure is a given value. Even if this process is not executed, the intake pressure can be increased by increasing the open degree TA of the throttle valve 14 when the abnormality diagnosis process is executed. This reduces the difference of the intake pressure and the exhaust pressure.

Operation Subjects of Pressure Increase Processor (14, 50; 14, 100)

The device, which reduces the amount of air drawn into the combustion chamber 24 under the condition that the intake pressure is a given value, is not limited to the variable valve characteristic mechanism.

For example, a multi-cylinder internal combustion engine may include a device that prevents air from being drawn into the combustion chamber of a cylinder. Even in this case, when the open degree TA of the throttle valve 14 is operated to control the air amount to the target air amount KL0*, the intake pressure can be increased. The above device includes, for example, a device that keeps the intake valve of a cylinder closed and keeps the exhaust valve open. This can be realized by using electromagnetic drive valves as the intake valve and the exhaust valve, the electromagnetic drive valves being opened and closed by electromagnetic force instead of the rotation power of the camshaft 40, and by executing the opening and closing operation by the ECU 80. Further, the device may stop the operation of a piston. This can be realized by a fastener such as a clutch that switches between connection and disconnection of the piston of a cylinder and the crankshaft 28.

In addition, a device that relatively slides a cylinder block and a crank case in the axial direction of a cylinder shaft so that a compression ratio is variable may be used. In this case, the amount of air drawn into the combustion chamber 24 can be reduced by arranging the cylinder block at a location distant from the crank case to reduce the compression ratio.

Further, a device in which the volume of the intake passage located at the downstream side of the throttle valve 14 is variable may be used. This can be realized as follows: the intake passage located at the downstream side of the throttle valve 14 has two independent passages, and the cross-sectional area of at least one of the two independent passages is adjusted to zero using a valve.

An actuator that is operated at the downstream side of the throttle valve 14 to draw in air having higher pressure than the downstream side is not limited to the throttle valve 14. For example, a valve that connects and disconnects the crank case and the intake passage 12 located at the downstream side of the throttle valve 14 may be used. Further, a valve that connects and disconnects a canister and the intake passage 12 located at the downstream side of the throttle valve 14 may be used.

Abnormality Diagnosis Method

The abnormality diagnosis method does not have to detect an EGR flow rate based on the intake pressure PI detected by the intake pressure sensor 98. For example, an air flow meter may be arranged in the exhaust gas recirculation passage 70 to detect the detection value.

Valve Opening Processor (S18)

The valve opening processor configured to open the recirculation valve 72 for abnormality diagnosis is exemplary only. The valve opening processor may be configured to open the recirculation valve for some reason during the fuel cut-off process.

The invention claimed is:

1. A controller for an internal combustion engine, wherein the internal combustion engine includes a throttle valve that adjusts a cross-sectional area of an intake passage, an exhaust gas recirculation device, and a fuel injection valve that injects fuel supplied to the internal combustion engine, the exhaust gas recirculation device includes an exhaust gas recirculation passage, which connects a portion of the intake passage located at a downstream side of the throttle valve with an exhaust passage, a recirculation valve, which opens and closes the exhaust gas recirculation passage and is configured to open when moved against pressure from the exhaust passage, and an actuator, which drives and opens the recirculation valve, the internal combustion engine includes a variable valve characteristic mechanism that allows a characteristic of an intake valve to be variable, the controller comprising:

a processor configured to:
execute a fuel cut-off process that stops fuel injection from the fuel injection valve;
open the recirculation valve when the fuel cut-off process is executed; and
execute a pressure increase process that increases pressure of the portion of the intake passage at the downstream side of the throttle valve before opening the recirculation valve so that the increased pressure is higher than a pressure of the portion of the intake passage just before executing the pressure increase process, wherein the pressure increase process includes
operating the variable valve characteristic mechanism to decrease an amount of air drawn into a combustion chamber of the internal combustion engine,
increasing an open degree of the throttle valve in accordance with the operation of the variable valve characteristic to decrease the amount of air drawn into the combustion chamber, and
opening the recirculation valve after increasing the open degree of the throttle valve.

2. The controller according to claim 1, wherein the processor is configured to set a target value of the amount of air drawn into the combustion chamber when the fuel cut-off process is executed, and operate the throttle valve to obtain the target value of the amount of air.

3. The controller according to claim 2, wherein the processor is configured to operate the throttle valve based on the target value and the characteristic of the intake valve.

4. The controller according to claim 1, wherein the processor is configured to change the characteristic of the intake valve to a predetermined characteristic that decreases the amount of air drawn into the combustion chamber under the condition that a pressure in the intake passage is a given value, before opening the recirculation valve.

5. The controller according to claim 1, wherein the processor is configured to diagnose the exhaust gas recirculation device and determine whether or not the exhaust gas recirculation device includes an abnormality based on whether or not fluid flows from the exhaust gas recirculation passage into the intake passage when opening the recirculation valve during execution of the fuel cut-off process.

6. The controller according to claim 1, wherein the variable valve characteristic mechanism varies a timing of the intake valve, and the open degree of the throttle valve is increased based on the timing of the intake valve.

* * * * *